Figure 1:
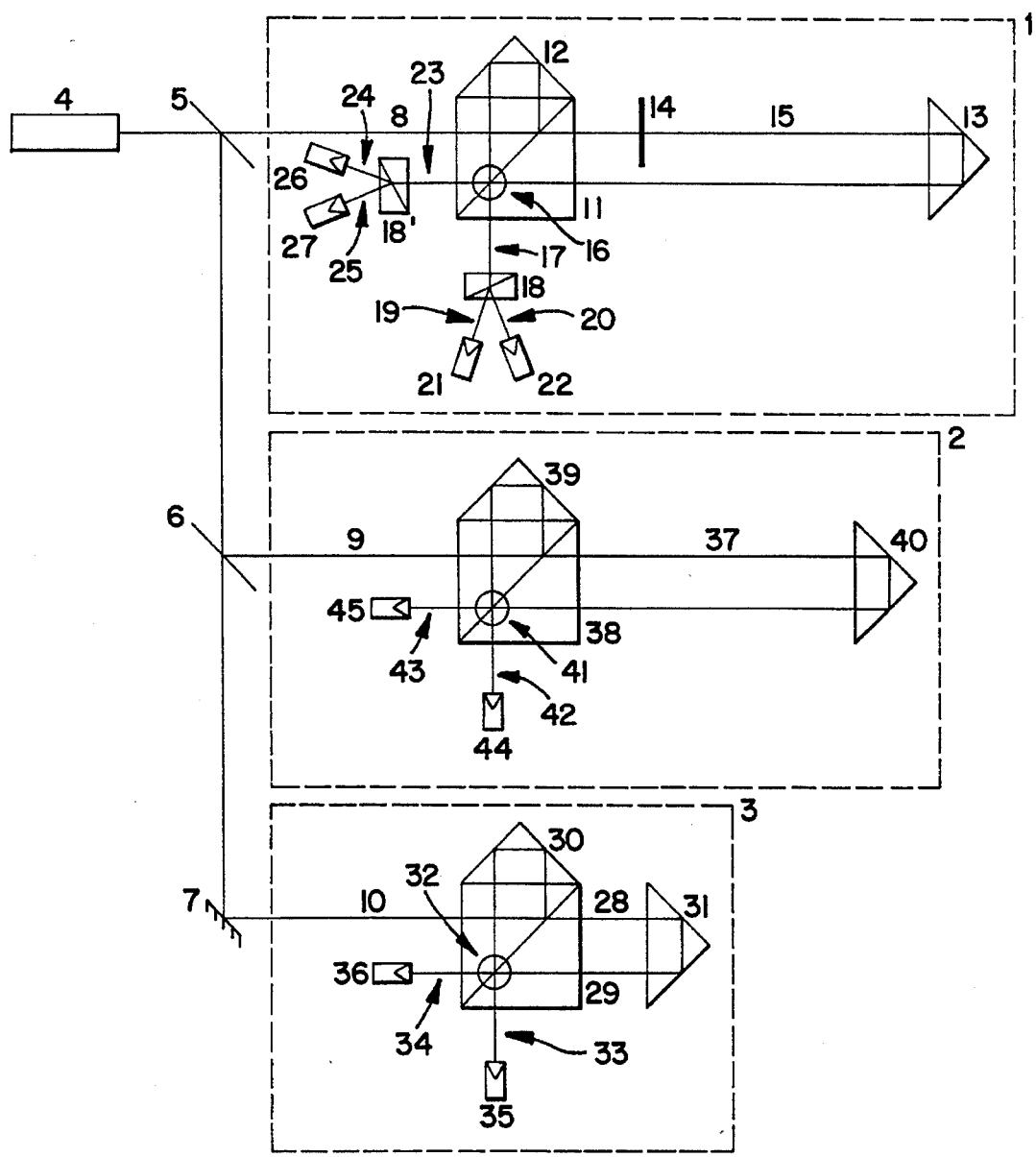

United States Patent [19]
Hantel et al.

[11] Patent Number: 5,596,410
[45] Date of Patent: Jan. 21, 1997

[54] INTERFEROMETER SYSTEM AND METHOD FOR CONTROLLING THE ACTIVATION OF A REGULATING INTERFEROMETER IN RESPONSE TO AN OUTPUT SIGNAL

[76] Inventors: Peter Hantel, Am Gänsemarkt 6, D-37276 Meinhard; Jürgen Thiel, Siemensstrasse 11, D-52074 Aachen, both of Germany

[21] Appl. No.: 403,824
[22] PCT Filed: Sep. 13, 1993
[86] PCT No.: PCT/DE93/00843
§ 371 Date: Apr. 24, 1995
§ 102(e) Date: Apr. 24, 1995
[87] PCT Pub. No.: WO94/07109
PCT Pub. Date: Mar. 31, 1994

[30] Foreign Application Priority Data

Sep. 14, 1992 [DE] Germany .............. 42 30 748.1

[51] Int. Cl.⁶ .................................... G01B 9/02
[52] U.S. Cl. ............. 356/358; 345/345; 345/346
[58] Field of Search .................. 356/345, 346, 356/358

[56] References Cited

U.S. PATENT DOCUMENTS

| | | |
|---|---|---|
| 4,765,741 | 8/1988 | Detro et al. |
| 4,900,151 | 2/1990 | Ulbers. |
| 4,984,898 | 1/1991 | Hofler et al. ............... 356/358 |
| 5,177,566 | 1/1993 | Leuchs et al. |

FOREIGN PATENT DOCUMENTS

| | | |
|---|---|---|
| 0284304 | 9/1988 | European Pat. Off. |
| 0290789 | 11/1988 | European Pat. Off. |
| 0401576 | 12/1990 | European Pat. Off. |
| 3404963 | 8/1985 | Germany. |
| 3833201 | 6/1989 | Germany. |
| 3911472 | 10/1990 | Germany. |
| 3930273 | 3/1991 | Germany. |

*Primary Examiner*—Samuel A. Turner
*Assistant Examiner*—Robert Kim
*Attorney, Agent, or Firm*—Brinks Hofer Gilson & Lione

[57] ABSTRACT

A laser interferometer having a laser to produce a beam of light and a first beam splitter to split the beam of light into first and second portions. The first portion is directed towards a measuring interferometer and the second portion is directed toward a first regulating interferometer having a regulating section. A beam director for directing a portion of the second portion of the beam of light toward a second regulating interferometer having a regulating section. A switch connected to the second regulating interferometer which turns the second regulating interferometer on when a first output signal is less than a first predetermined maximum signal threshold value or exceeds a first predetermined minimum signal threshold value and if the second regulating interferometer has the next largest regulating section length relative to the length of the regulating section of the first regulating interferometer. The switch also turns the second regulating interferometer on when the first output signal exceeds a second predetermined maximum signal threshold value or is less than a second predetermined minimum signal threshold value and if the second regulating interferometer has the next smallest regulating section length relative to the length of the regulating section of the first regulating interferometer. A control device for controlling the wavelength of the beam of light in response to the output control signal corresponding to the regulating interferometer switched on at that given time.

29 Claims, 2 Drawing Sheets

[5,596,410]

INTERFEROMETER SYSTEM AND METHOD FOR CONTROLLING THE ACTIVATION OF A REGULATING INTERFEROMETER IN RESPONSE TO AN OUTPUT SIGNAL

DESCRIPTION

The invention concerns an interferometric measurement process, in particular for length measurement by means of a laser, whereby when a measuring interferometer is in operational state the laser wavelength is controlled by virtue of the fact that the output signal of a regulating interferometer, which changes periodically with the laser wavelength in the form of a wave, adjusts within a wave period to a value in the area of a wave edge, for example, and changes in the operational state of the measuring interferometer, i.e. the laser frequency and/or the wavelength of the laser beam, are detected in the regulating section of the regulating interferometer and compensated via the operating current and/or the temperature of the laser, with a corresponding effect on the measuring interferometer, together with a laser interferometer configuration suitable for implementation of this process, incorporating a laser which is mode jump-free and continuously tunable in a specified wavelength range, an initial measuring interferometer and an initial regulating interferometer, with a measuring and regulating section respectively, whereby a constant difference in length applies with regard to the arms of the regulating interferometer, further incorporating a primary beam splitter to split the incident laser beam so that the radiation from one and the same laser is supplied to the interferometers, whereby for the purpose of forming at least two mutually interfering sub-beams, the measuring interferometer possesses at least one primary non-polarised beam splitter, two retroreflectors or, alternatively, one or more reflectors or 90° prisms, for example, further incorporating means to generate mutually phase-displaced beam components to enable identification of the direction of changes in the length of the measuring section, such as quarter-wave or eighth-wave plates, and means to separate the phase-displaced beam components, such as polarised beam splitters or Wollaston prisms, further incorporating at least one photo-detector to detect the interference signal, and whereby for the purpose of forming at least two mutually interfering sub-beams the regulating interferometer possesses at least one primary beam splitter, two retroreflectors or, alternatively one or more reflectors or 90° prisms, for example, and at least one photo-detector to detect the interference signal, and finally incorporating a control device for the laser wavelength.

Mode jump-free, variable semiconductor lasers are being employed to an increasing extent in interferometers of the above-stated type. One reason for this is the relatively low unit costs for laser diodes in comparison to conventional laser sources. In addition to this, however, laser diodes are continuously variable over a wavelength range which is around twice as broad as that which applies to helium-neon lasers, for example. Conversely, however, semiconductor lasers have the disadvantage that their resonance wavelength is highly dependent on the operating parameters of the laser diode, as a result of which the laser wavelength is subject to time fluctuations. Additionally, fluctuations of the air wavelength may also occur in the measuring or regulating section, due to certain sections of the laser beam passing through open air, the refractive index of which may also be subject to fluctuations, for example on account of a change in the ambient temperature, humidity or the $CO_2$ content of the air.

The semiconductor interferometer described in DE-PS 3 404 963 counters this problem via the use of a further interferometer to control the air wavelength, in addition to the actual measuring interferometer. This so-called regulating interferometer is configured in such a manner that a constant difference applies with regard to the respective lengths of the interferometer arms. The radiation from one and the same laser diode is supplied to both the measuring interferometer and the regulating interferometer. Should the air wavelength now alter within the measuring section of the regulating interferometer (referred to below as the "regulating section"), due to fluctuations in the refractive index of the medium through which the laser beam passes, for example, or on account of fluctuations in the wavelength of the laser diode itself, the intensities of the two phase-displaced output signals of the regulating interferometer will alter accordingly. The output signals are maintained at a constant level of intensity by means of a controller which alters the laser wavelength via the current or the temperature of the laser diode, whereby this is most simply attainable by adjusting the difference between the two output signals to a value of zero. As it can be assumed on the basis of the spatial arrangement of the measuring and regulating sections that their ambient conditions are virtually identical, the fluctuations of the air wavelength in the measuring section, which are actually the fluctuations of primary interest here, are also compensated by this method.

As the differential signal changes periodically with the laser or air wavelength, it must be ensured when switching on the laser that this wavelength is within the range which corresponds to this period. If this is not the case, the system is to be adjusted to a different wavelength. The period of the differential signal becomes smaller as the length of the regulating section increases, as a result of which the permissible range for the wavelength of the laser diode upon activation becomes smaller. However, as the air wavelength is critically dependent on the air parameters temperature and pressure, to ensure that a certain period of the differential signal is attained the regulating section must not be longer than approx. 2 cm, if a temperature difference from the ambient air of ±5° C. is permitted. Furthermore, there is a danger that sudden strong changes in the refractive index of the air, due to air currents, for example, may lead to the wavelength changing in such a manner as to cause the differential signal to jump to a neighbouring order of interference, subsequently adjusting the regulating interferometer to a different wavelength. On the other hand, however, a longer regulating section is desirable, because the sensitivity of the wavelength regulating function increases with the length of the regulating section.

These problem areas lead to the objective pursued by the present invention, namely to configure an interferometric measuring process and an appurtenant laser interferometer which at one and the same time ensures that a constant air wavelength is maintained on activation of the system and permits the most sensitive possible regulation system with a relative uncertainty of $10^{-8}$, which is also able to identify jumps to neighbouring control points.

This objective is fulfilled by a process of the type specified at the beginning of this description by virtue of the fact that at least two regulating interferometers with regulating sections of different lengths are employed, whereby one or two upper and one or two lower signal thresholds are set, for example, in the area of the wave edges of the regulating interferometers, and by virtue of the fact that the system switches to the next regulating interferometer with a shorter regulating section, upon the signal exceeding an initial upper signal threshold or falling below an initial lower signal threshold, unless the regulating interferometer with the shortest regulating section is already active, and by virtue of the fact that the system switches to the next regulating interferometer with a longer regulating section, upon the signal exceeding a second upper signal threshold—which is generally smaller than or, at most, equal to the first upper signal threshold—, or falling below a second lower signal threshold—which is generally greater than or at least equal to the first lower signal threshold—, unless the regulating interferometer with the longest regulating section is already active. The regulating interferometer with the shortest regulating section is generally active during the starting-up process, in order to ensure a constant air wavelength, while conversely the regulating interferometer with the longest regulating section is employed to carry out the most sensitive wavelength regulation with the highest level of wavelength stability.

The length of the shortest regulating section is determined on the one hand by the permissible change in the refractive index upon starting up the system and on the other by the reproducible accuracy with which the laser wavelength can be set over the operating parameters of the laser source. Regulation can be effected, for example, by presetting the air wavelength in the regulating section with the operating parameters of the laser source upon activation of the laser source, so as to find that period of the differential output signal of the currently active regulating interferometer which corresponds to a certain air wavelength, after which the air wavelength is adjusted to the exact value by means of the controller and the shortest regulating section. It must be ensured here that the air wavelength lies within this specific period of the next longest regulating interferometer. Using suitable change-over switches, the regulating process is then successively switched as required to the next longest regulating interferometer, thereby ensuring increased sensitivity of wavelength regulation in conjunction with high reproducibility of the starting wavelength. This graduated process is repeated in accordance with the number of employed regulating interferometers, until regulation is carried out with the regulating interferometer which has the longest regulating section.

A change in disturbance-free "operational state" due, for example, to a sudden air current, as a result of which the output signal of the currently active regulating interferometer jumps—initially undetected—to a neighbouring order of interference, can now be detected via a change in the output signal of the regulating interferometer with the shorter regulating section. This change is used to identify a jump to neighbouring orders of interference by setting an upper and a lower electronic signal threshold in such a manner that, upon the signal exceeding the upper threshold or falling below the lower threshold, the regulating system is switched to the regulating interferometer which has identified the jump. This ensures that the original wavelength is reset. When the output signal of the subsequently active regulating interferometer is again in the mid-range of the wave edge within the first and second signal thresholds, the system is switched to the regulating interferometer with the next longest regulating section. When several regulating interferometers are in operation, this process is carried out successively.

When using several interferometers in particular, this configuration enables both high reproducibility of the air wavelength on switching on the system—even when highly variable ambient conditions apply—and extremely stable wavelength regulation in operational state, due to the higher sensitivity of the regulating interferometer with the longest regulating section. Any jumps of the output signal of the currently active interferometer to other orders of interference are detected, enabling automatic resetting to the original wavelength. This ensures that the measuring interferometer always measures with the same air wavelength, even if the refractive index of the air alters.

The measurement process in accordance with the present invention can also be configured in such a manner that at least two output signals with a relative phase displacement of n are generated by means of the currently active regulating interferometer, whereby these output signals alter inversely with the laser wavelength, and the differential signal of these output signals, which changes periodically with the laser wavelength, is regulated within a wave period to a value of zero, for example. The reproducibility and accuracy is increased in comparison to operation of the output signal of the currently active regulating interferometer in the range of a wave edge by regulating the differential signal to the precisely defined value of zero. The phase displacement of n leads to automatic inverse changing of the two output signals of the active regulating interferometer with the wavelength, thereby compensating any signal changes caused, for example, by a voltage offset.

The invented laser interferometer configuration which is suitable for this process is characterised in that at least two regulating interferometers graduated in cascade form with regard to the length of the regulating section are provided, whereby at least the regulating section of the regulating interferometer with the longest regulating section is located as closely as possible to the measuring section in accordance with the configuration of the employed apparatus, and in that one additional beam splitter or reflector is provided for the second regulating interferometer and each additional regulating interferometer. Successive regulating interferometers thus possess regulating sections of successively changing length, whereby the regulating interferometer with the longest regulating section offers the highest measuring sensitivity, while the regulating interferometer with the shortest regulating section maintains a constant wave period. Positioning the longest regulating section as closely as possible to the measuring section ensures highly sensitive detection of fluctuations in the refractive index within the measuring section. Further details regarding the design of the measuring interferometers are already known from the cited prior art. The use of additional beam splitters or reflectors ensures that both the measuring interferometer and all the regulating interferometers receive their radiation from the same laser. A semiconductor laser is particularly expedient as the laser source. A constant difference applies with regard to the lengths of the respective arms of the regulating interferometers, which are graduated in the form of a cascade.

The laser interferometer configuration in accordance with the present invention can further be configured in such a manner that the maximum length, Lmax, of the shortest regulating section is calculated on the basis of the laser wavelength, lambda, the relative stability of the laser, $\alpha$, and the stability of the refractive index of the air, $\beta$, in accordance with Lmax <lambda/[4($\alpha$+$\beta$], and that the maximum length of the longest regulating section is equal to the measuring section. The stability of the laser is determined primarily by temperature fluctuations and ageing effects of the laser diode. The fluctuations in the refractive index apply in particular to the area surrounding the measuring section. At values of $\alpha=5\cdot 10^{-5}$ and $\beta=5\cdot 10^{-5}$ (for temperature fluctuations of ±25° C.) and a laser wavelength of 780 nm, for example, a maximum length of $\leq 2$ mm applies for the shortest regulating section.

The laser interferometer configuration in accordance with the present invention can further be configured in such a manner that a length ratio of between 1 to 5 and 1 to 10 applies among the regulating sections. These length ratios ensure on the one hand that the successive switching from one regulating interferometer to the next will not lead to a jump to neighbouring wave periods, while on the other hand only a small number of interferometers connected in succession are sufficient to cover a relatively broad sensitivity range, whereby at one extreme a particularly high level of sensitivity is ensured, while in the other extreme no jumping to neighbouring wave periods will occur, even in the event of relatively strong changes in the air wavelength or laser wavelength.

The laser interferometer configuration in accordance with the present invention can further be configured in such a manner that the regulating sections at least are located on a material with a low coefficient of expansion, such as the glass ceramic Zerodur, chemical fibre-reinforced composite or others. As has already been established, a constant difference applies with regard to the arms of the respective regulating interferometers, and these interferometer arms serve exclusively to detect changes in the air wavelength or laser wavelength and to compensate such changes by altering the laser wavelength. However, as the output interference signals of the regulating interferometers are also extremely dependent on the respective arm lengths of the regulating interferometers, the possibility of any such influence can be virtually eliminated via this measure.

The laser interferometer configuration in accordance with the present invention can further be configured in such a manner that the regulating sections at least are located on a material, such as steel, the coefficient of expansion of which corresponds to that of the workpiece to be measured or machined and/or the entire measuring or machining device. This measure enables temperature-induced changes in the length of a workpiece to be compensated in the course of machining of the workpiece, for example.

The laser interferometer configuration in accordance with the present invention can further be configured in such a manner that at least two measuring interferometers are provided, whereby the number of measuring interferometers can even be greater than the number of regulating interferometers. The laser interferometer configuration in accordance with the present invention can further be configured in such a manner that at least part of the configuration is designed as an integrated optical system. Due to the exclusive use of standard components for the optical system of the laser interferometer configuration, it is further possible to configure some of these components or even all components as an integrated optical system.

The laser interferometer configuration ill accordance with the present invention can further provide for the peripheral equipment to be connected to the optical components via established light guides, such as fibre optic light guides.

Finally, the laser interferometer configuration in accordance with the present invention can further be configured in such a manner that a joint interferometer beam splitter is provided for the measuring interferometer and the regulating interferometer. Such a beam splitter can be employed in place of a primary beam splitter and, where appropriate, additional reflectors, and enables all or at least some of the interferometers to be positioned at an extremely small distance from one another, whereby the primary beam of the laser is widened prior to entering the individual interferometers. This measure enables the interferometers to be mounted in a simple manner one on top of the other, for example.

In the following part, an embodiment of the laser interferometer configuration is presented for the purpose of explaining the measurement process in accordance with the present invention and the appurtenant laser interferometer configuration. The process in accordance with the present invention is then explained on the basis of this embodiment.

Figure 2:
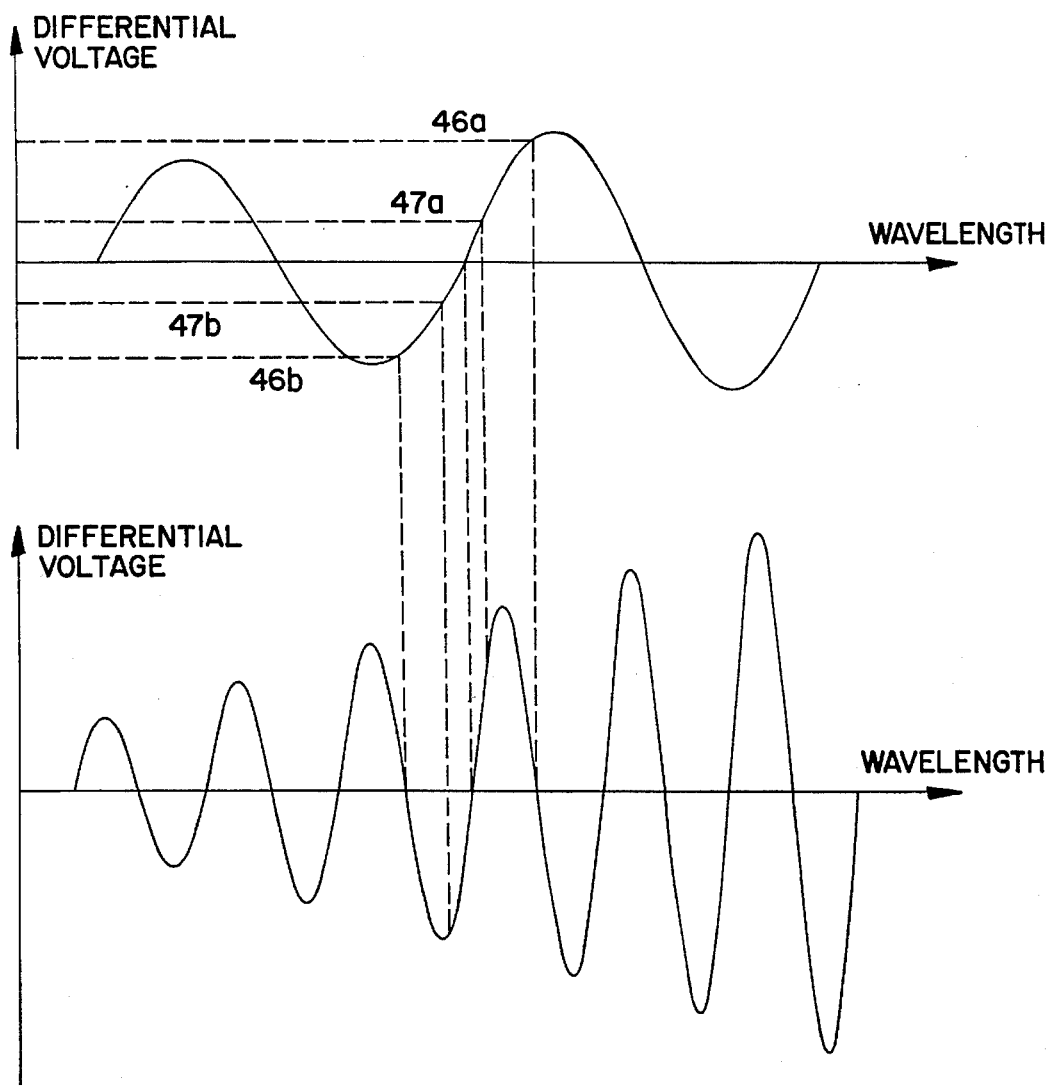

FIG. 1 shows a laser interferometer configuration with one measuring interferometer and two regulating interferometers, and FIG. 2 illustrates the measurement process on the basis of the differential voltage of the two photo-detectors of two regulating sections.

FIG. 1 shows a laser interferometer configuration incorporating one measuring interferometer, 1, and two regulating interferometers, 2, 3. All the interferometers are supplied with the radiation from one laser diode, 4, which is split via primary beam splitters, 5, 6 and a reflector, 7, into primary sub-beams, 8, 9, 10. Alternatively, components 5, 6, 7 can be replaced by diffraction gratings.

A fast current regulating system which operates in the range of several kHz can be provided for activation of the laser diode. While a configuration incorporating two regulating interferometers represents the simplest embodiment, configurations involving more than two regulating interferometers are also conceivable.

The primary sub-beam, 8, which passes through the measuring interferometer, 1, is first of all split into two sub-beams with interference capability at a beam splitter, 11, one of these sub-beams being reflected back parallel to its direction of incidence via multiple deflection at a retroreflector, 12, while the other sub-beam is reflected back in parallel direction via multiple deflection at a retroreflector, 13, the variable position of which defines the actual length to be measured. This second sub-beam then passes through a quarter-wave plate, 14, which it leaves divided into two beam and polarisation components with a mutual phase displacement of, for example, $\pi/2$. These two components now provide the basis for detecting the direction of motion of retroreflector 13 relative to the other components of the measuring interferometer, 1. The sub-beams which are reunified at point 16 overlap within the respective sub-sections, 17, 23, and form the actual interference signals. Finally, one of these interference signals passes through a polarising beam splitter, 18, in this example a Wollaston prism (alternatively, a 90° dividing prism or a non-polarising beam splitter with down-line optical components which separate the polarisation components could be employed, for example), after which two further sub-beams, 19, 20, are formed, each of which is detected by a photo-detector, 21, 22. The two sub-beams, 19, 20, represent the different interferences of the phase-displaced signals generated at the quarter-wave plate, 14, with the second sub-beam, which is employed to detect the direction of motion of the retroreflector, 13.

The second interference signal, which is formed in sub-section 23, also passes through a polarising beam splitter, 18', in this example a Wollaston prism or, alternatively, another opto-polarising component, after which the resultant split sub-beams, 24, 25, are again detected by photo-detectors, 26, 27.

As a result of the phase displacement caused by the quarter-wave plate, a phase displacement of $\pi/2$ applies with regard to the intensity between components 19, 20 in sub-section 17 and components 24, 25 in sub-section 23 respectively, providing a total of four signals, each with a relative phase displacement of π/2, at photo-detectors 21, 22, 26, 27. At least two signals with a phase displacement of π/2 are necessary to detect the motion of direction of retroreflector 13. Offset fluctuations, for example, are virtually eliminated by establishing the differential between the respective n-displaced output signals.

Primary sub-beam 10 passes through the regulating interferometer, 3, which possesses the shorter regulating section, 28, of the two regulating interferometers, 2, 3, and the length of which is furthermore constant. A beam splitter, 29, divides the primary sub-beam, 10, into two sub-beams with interference capability, whereby one sub-beam is reflected at one retroreflector, 30, while the other sub-beam is reflected in the same manner at another retroreflector, 31. The sub-beams which are reunified at point 32 overlap both in sub-section 33 and sub-section 34 and form the actual interference signals of the regulating interferometer, 3. These interference signals are phase-displaced by n and change inversely with the laser wavelength. The interference signals (=output signals) are detected via photo-detectors, 35, 36. For particularly effective analysis of these output signals, it is expedient to adjust the n phase-displaced output signals which change inversely with the laser wavelength to a value of zero as the differential signal within a wave period.

Primary sub-beam 9, on the other hand, passes through regulating interferometer 2, incorporating the second regulating section in this example, 37, the length of which is also constant. Should n regulating interferometers be employed, however, this would be the nth regulating section. A beam splitter, 38, divides primary sub-beam 9 into two sub-beams with interference capability, one of which is reflected back at one retroreflector, 39, while the other is reflected back at another retroreflector, 40. The sub-beams which are reunified at point 41 interfere with one another in sub-sections 42, 43. Here again, the two n phase-displaced interference signals are detected by photo-detectors, 44, 45.

FIG. 2 shows the differential voltage at the output of the two photo-detectors, 35, 36 and 44, 45, as a function of the wavelength- The upper part of the figure shows the differential voltage of the photo-detectors, 35, 36, of the regulating interferometer, 3, with the shorter regulating section, while the lower part shows the corresponding output voltage of the regulating interferometer, 2, with the longer regulating section, 37. The amplitude of the differential voltage, which increases with the wavelength, is based on the power characteristic of the laser diode.

Two upper, 46a, 47a, and two lower threshold voltages, 46b, 47b, are plotted for the differential voltage shown in the upper part of the figure. These thresholds define the points at which the system is switched to the next regulating interferometer with the next shortest or next longest regulating section respectively. Assuming that regulating interferometer 2 with the longer regulating section, 37, were initially active when the measuring interferometer, 1, is in operational state, a differential voltage as shown in the lower part of FIG. 2 would be obtained, for example. In the event of a change in the operational state, due to fluctuations in the air wavelength within the regulating section, 37, for example, the system would be switched to the regulating interferometer with the next shortest regulating section—in this example regulating interferometer 3—as a result of the output signal exceeding the upper threshold voltage, 47a, or, alternatively, falling below the lower threshold voltage, 47b. As a result, an output voltage in accordance with the upper part of the figure would again be obtained. If the output signal were subsequently to fall below the upper threshold voltage, 47a, or rise above the lower threshold voltage, 47b, as a result of the regulating functions, the system would be switched back to the next longest regulating section, in this case regulating interferometer 2. Conversely, if the output signal were to rise above the upper threshold voltage, 46a, or fall below the lower threshold voltage, 46b, the system would be switched to the regulating interferometer with the next shortest regulating section (not shown here). This process is repeated accordingly for each disturbance which occurs.

| Reference numbers | |
|---|---|
| Device | |
| 1 | Measuring interferometer |
| 2,3 | Regulating interferometer |
| 4 | Laser diode |
| 5,6 | Primary beam splitter |
| 7 | Reflector |
| 8,9,10 | Primary sub-beam |
| 11 | Beam splitter |
| 12,13 | Retroreflector |
| 14 | Quarter-wave plate |
| 15 | Measuring section |
| 16 | Point of unification for the interfering sub-beams |
| 17 | Sub-section (interference) |
| 18,18' | Polarising beam splitter |
| 19,20 | Phase-displaced sub-beam |
| 21,22 | Photo-detector |
| 23 | Sub-section (interference) |
| 24,25 | Phase-displaced sub-beam |
| 26,27 | Photo-detector |
| 28 | First regulating section |
| 29 | Beam splitter |
| 30,31 | Retroreflector |
| 32 | Point of unification for the interfering sub-beams |
| 33,34 | Sub-section (interference) |
| 35,36 | Photo-detector |
| 37 | 2nd or nth regulating section |
| 38 | Beam splitter |
| 39,40 | Retroreflector |
| 41 | Point of unification for the interfering sub-beams |
| 42,43 | Sub-section (interference) |
| 44,45 | Photo-detector |
| Measurement process | |
| 46, 47a | Upper threshold voltages |
| 46b, 47b | Lower threshold voltages |

We claim:

1. A method of using a laser interferometer comprising a measuring interferometer and at least a first regulating interferometer and a second regulating interferometer having regulating sections of differing lengths, said method comprising the steps of:

employing a laser in said measuring interferometer to produce a beam of light in said measuring interferometer;

directing a portion of said beam of light to said first regulating interferometer;

producing a first output signal from said first regulating interferometer;

setting a first maximum signal threshold value;

setting a second maximum signal threshold value;

setting a first minimum signal threshold value;

setting a second minimum signal threshold value;

switching on said first regulating interferometer;

wherein when the output signal of the first regulating interferometer has a value which rises above said second maximum signal threshold value or falls below said second minimum signal threshold value said second regulating interferometer is switched on if it has the next smallest regulating section length relative to the length of said regulating section of said first regulating interferometer;

wherein when the output signal of the first regulating interferometer has a value which falls below said first maximum signal threshold value or rises above said first minimum signal threshold value, said second regulating interferometer is switched on if it has the next largest regulating section length relative to the length of said regulating section of said first regulating interferometer;

controlling, at any given time, the wavelength of said beam of light in response to the output control signal corresponding to the regulating interferometer switched on at that given time.

2. The method of claim 1, comprising the step of controlling, at any given time, the operating current of said laser in response to the output control signal corresponding to the regulating interferometer switched on at that given time.

3. The method of claim 1, comprising the step of controlling, at any given time, the temperature of said laser in response to the output control signal corresponding to the regulating interferometer switched on at that given time.

4. The method of claim 1, wherein said second maximum signal threshold value is greater than said first maximum signal threshold value and said second minimum signal threshold value is less than said first minimum signal threshold value.

5. A laser interferometer comprising:

a laser to produce a beam of light;

a first beam splitter to split said beam of light so that a first portion of said beam of light is directed towards a measuring interferometer and a second portion of said beam of light is directed toward a first regulating interferometer;

a beam director for directing a portion of said second portion of said beam of light toward at least a second regulating interferometer;

said measuring interferometer having a measuring section;

said first regulating interferometer having a regulating section having a first length and a detector producing a first output signal;

said second regulating interferometer with a regulating section having a second length which is different than said first length and a detector producing a second output signal;

a switch connected to said second regulating interferometer which turns said second regulating interferometer on when said first output signal is less than said first predetermined maximum signal threshold value or exceeds said first predetermined minimum signal threshold value and if said second regulating interferometer has the next largest regulating section length relative to the length of said regulating section of said first regulating interferometer;

said switch turns said second regulating interferometer on when said first output signal exceeds a second predetermined maximum signal threshold value or is less than a second predetermined minimum signal threshold value and if said second regulating interferometer has the next smallest regulating section length relative to the length of said regulating section of said first regulating interferometer;

a control device for controlling, at any given time, the wavelength of said beam of light in response to the output control signal corresponding to the regulating interferometer switched on at that given time.

6. The interferometer of claim 5, wherein said laser is mode jump-free and continuously tunable in a specified wavelength range.

7. The interferometer of claim 5, wherein said first and second regulating interferometers are graduated in cascade form with regard to the length of the regulating section.

8. The interferometer of claim 5, wherein said measuring interferometer comprises at least one primary non-polarised beam splitter, wherein said primary non-polarized beam splitter splits said first portion of said beam of light so that a portion thereof is directed towards a first retroreflector located in said measuring section and another portion thereof is directed towards a second retroreflector located in said measuring interferometer, said first and second retroreflectors directing said respective portion of said first portion of said beam of liquid back to said primary non-polarized beam splitter.

9. The interferometer of claim 8, wherein said measuring interferometer further comprises:

means to generate mutually phase-displaced beam components to enable identification of the direction of changes in the length of the measuring section;

means to separate the phase-displaced beam components; and at least one photo-detector to detect an interference signal generated in said measuring interferometer.

10. The interferometer of claim 9, wherein said means to generate mutually phase-displaced beam components comprises a quarter-wave plate or an eighth-wave plate.

11. The interferometer of claim 9, wherein said means to separate the phase-displaced beam components comprises a polarized beam splitter or a Wollaston prism.

12. The interferometer of claim 5, wherein said first regulating interferometer comprises:

at least one primary beam splitter to produce two sub-beams;

one or more beam directors to receive said two sub-beams; and at least one photo-detector to receive said two sub-beams from said one or more beam directors and detect an interference signal from said two sub-beams.

13. The interferometer of claim 5, wherein said regulating section of said first regulating interferometer is located as closely as possible to the measuring section of said measuring interferometer.

14. The interferometer of claim 5, wherein said beam director comprises a reflector.

15. The interferometer of claim 5, wherein said beam director comprises a beam splitter.

16. The interferometer of claim 5, wherein the maximum length, Lmax, of the regulating section of the second regulating interferometer is calculated on the basis of the laser wavelength, lambda, the relative stability of the laser, $\alpha$, and the stability of the refractive index of the air, $\beta$, in accordance with the formula $$Lmax < lambda/[4(\alpha+\beta)].$$

17. The interferometer of claim 16, wherein the length of the regulating section of the longest regulating interferometer is equal to the length of the measuring section.

18. The interferometer of claim 16, wherein the length ratio between the lengths of the regulating sections of the first and second regulating interferometers ranges from 0.1 to 0.2.

19. The interferometer of claim 5, wherein the length ratio between the lengths of the regulating sections of the first and second regulating interferometers ranges from 0.1 to 0.2.

20. The interferometer of claim 5, wherein said regulating sections of said first and second regulating interferometers are located on a material with a low coefficient of expansion.

21. The interferometer of claim 20, wherein said material comprises glass ceramic Zerodur.

22. The interferometer of claim 20, wherein said material comprises a chemical fibre-reinforced composite.

23. The interferometer of claim 5, wherein said regulating sections of said first and second regulating interferometers are located on a material having a coefficient of expansion of which corresponds to that of a workpiece to be measured and/or the entire measuring or machining device.

24. The interferometer of claim 23, wherein said material comprises steel.

25. The interferometer of claim 5 comprising a second measuring interferometer to receive a portion of said beam of light.

26. The interferometer of claim 5, wherein a joint interferometer beam splitter is provided for the measuring interferometer and said first regulating interferometer.

27. The interferometer of claim 5, wherein said second maximum signal threshold value is greater than said first maximum signal threshold value and said second minimum signal threshold value is less than said first minimum signal threshold value.

28. The interferometer of claim 5, wherein said interferometer comprising of two or more regulating interferometers and the maximum length of any of said two or more regulating interferometers is equal to the length of said measuring section.

29. The interferometer of claim 5, wherein said interferometer comprising of two or more regulating interferometers and wherein when the two or more regulating interferometers are ranked in accordance with the length of their regulating sections, regulating interferometers adjacent in rank have a length ratio between the lengths of their regulating sections which ranges from 0.1 to 0.2.

* * * * *